US006546848B2

(12) United States Patent
Ehlhardt et al.

(10) Patent No.: US 6,546,848 B2

(45) Date of Patent: Apr. 15, 2003

(54) APPARATUS FOR DEEP-FRYING FOOD

(75) Inventors: Huub Ehlhardt, Groningen (NL); Mindert Kats, Drachten (NL); Klaas Kooyker, Drachten (NL); Adriaan Netten, Drachten (NL); Bart Johannes Massee, Groningen (NL); Iwald Randolf Mons, Groningen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/201,663

(22) Filed: Jul. 23, 2002

(65) Prior Publication Data

US 2003/0029323 A1 Feb. 13, 2003

(30) Foreign Application Priority Data

Jul. 26, 2001 (EP) ........................................ 01202854

(51) Int. Cl.[7] ........................ A47J 36/38; A47J 37/12

(52) U.S. Cl. ........................ 99/403; 99/330; 99/331; 99/410; 99/467; 99/341

(58) Field of Search .................. 99/326–333, 403–417, 99/467, 341, 473; 126/369, 20, 391.1, 299 D, 299 E; 55/288, DIG. 36; 210/167, DIG. 8, 184, 187, 471; 219/401; 165/104.31, 104.21, 31, 32, 39, 96, 911

(56) References Cited

U.S. PATENT DOCUMENTS 4,505,193 A * 3/1985 Mariotti ........................ 99/330
4,520,717 A * 6/1985 Bohrer, Jr. et al. .... 55/DIG. 36
4,539,898 A * 9/1985 Bishop et al. ................ 99/407
4,668,390 A * 5/1987 Hurley et al. ............... 210/167
4,995,312 A * 2/1991 Leiros ......................... 99/411
5,165,329 A * 11/1992 Jacob et al. .................. 99/407
5,297,474 A * 3/1994 Tabuchi ................. 210/DIG. 8
5,367,949 A * 11/1994 Nitschke et al. ....... 55/DIG. 36
5,379,684 A * 1/1995 Ettridge ....................... 99/413
5,452,648 A * 9/1995 Hohler et al. ................. 99/408
5,584,234 A * 12/1996 Bailieul et al. ............... 99/403
5,613,424 A * 3/1997 Chameroy et al. ............ 99/337
5,996,477 A * 12/1999 Bois et al. .................... 99/403

FOREIGN PATENT DOCUMENTS

DE 3103450 A1 10/1982
WO WO9423626 10/1994

* cited by examiner

*Primary Examiner*—Timothy F. Simone
(74) *Attorney, Agent, or Firm*—Frank Keegan

(57) ABSTRACT

An apparatus for deep-frying food, including a window (22) of a transparent material which takes up at least a portion of a cover (5; 105; 205) and which extends at least partially at an angle or vertically. A vapor discharge channel (6) communicates with the inner space (3) of the pan. A cooling surface (7) is provided for cooling vapor, which cooling surface communicates with the inner space (3) via the vapor discharge channel (6). A storage reservoir (13) is used for storing condensate that has precipitated on the cooling surface (7), and a collecting gutter (21; 121; 221) serves for collecting condensate that has precipitated on the window (22). The collecting gutter (21; 121; 221) extends along a bottom end of the window (22) and includes a drain (30; 130), via which drain the collecting gutter (21; 121; 221) communicates also with the vapor discharge channel (6) for draining condensate to the vapor discharge channel (6). Furthermore, a provision for signalling deep-frying activity in response to heating by hot vapor is described.

11 Claims, 2 Drawing Sheets

APPARATUS FOR DEEP-FRYING FOOD

The invention relates to an apparatus for deep-frying food, comprising:

- a pan for containing a frying medium which is liquid in use,
- a cover, the cover, when placed on the pan, and the pan together defining an inner space,
- a window of a transparent material, which takes up at least a portion of a cover and which extends at least partially in a sloping or vertical manner, and
- a vapor discharge channel communicating with said inner space and extending from an upper portion of said inner space.

Such an apparatus is known from German patent application no. 31 03 450. The transparent material of the window of said apparatus also forms a holder for retaining a filter element in position in a space which has been left open in the cover for that purpose. One drawback of said apparatus is the fact that the window is so small that it does not provide a good view of the food that is being deep-fried. One problem in particular is the fact that a person looking through the window obstructs the incident light in the direction of view, as a consequence of which the food being viewed is not sufficiently illuminated to be able to judge whether it is done yet.

International patent application WO 94/23626 discloses a deep-frying apparatus including a vapor discharge channel which extends upwards through the cover from the inner space and then downwards to a cooling surface of a cooling element, on which the vapor being released during the deep-frying process can be caused to precipitate. Said apparatus does not include a window that makes it possible to inspect the food being deep-fried without having to open the cover, however.

An object of the invention is to make it easier to view food that is present in the pan. According to a first aspect of the invention, this object is accomplished by providing a simple solution which makes it possible to use a large window for inspecting food without opening the cover while preventing water that condenses on the transparent material in the window from finding its way into the frying medium. Water dropping into hot frying fat or the like causes hot frying medium to splash high. Especially in the open position of the cover, this involves a risk of the user being injured.

According to the present invention, the above solution is realized by means of an apparatus which is characterized by

- a cooling surface for cooling vapors, which cooling surface communicates with said inner space via at least a portion of said vapor discharge channel,
- a storage reservoir for storing condensate that has precipitated on the cooling surface, into which storage reservoir the vapor discharge channel opens, and
- a collecting gutter for collecting condensate that has precipitated on the window, which collecting gutter extends along a bottom end of the window and is provided with a drain, via which drain the collecting gutter communicates with the vapor discharge channel for draining condensate to the vapor discharge channel.

With deep-frying apparatuses according to the invention, the water that condenses on the transparent material in the sloping or vertical window runs down over said material and is caught in the collecting gutter. From the collecting gutter, the water is discharged to the vapor discharge channel, via which the water reaches the storage reservoir for water that has condensed on a special cooling surface. The vapor discharge channel thus functions not only as a means for discharging vapor, but also as a discharge channel for water that has condensed on the transparent material.

According to another aspect of the invention, this objective is accomplished by providing a solution which signals that food is being deep-fried in the pan. This solution is realized by providing an apparatus as claimed in claim 10. This solution is based on the insight that water being released from the food in the form of hot vapor during deep-frying activity will heat the vapor discharge channel. Detection of said heating makes it possible to signal whether food is being deep-fried without having to look into the pan.

Especially advantageous embodiments of the invention are defined in the dependent claims.

Further aspects, effects and details of the invention will be described hereinafter by means of examples of embodiment illustrated in the drawings.

Figure 1:
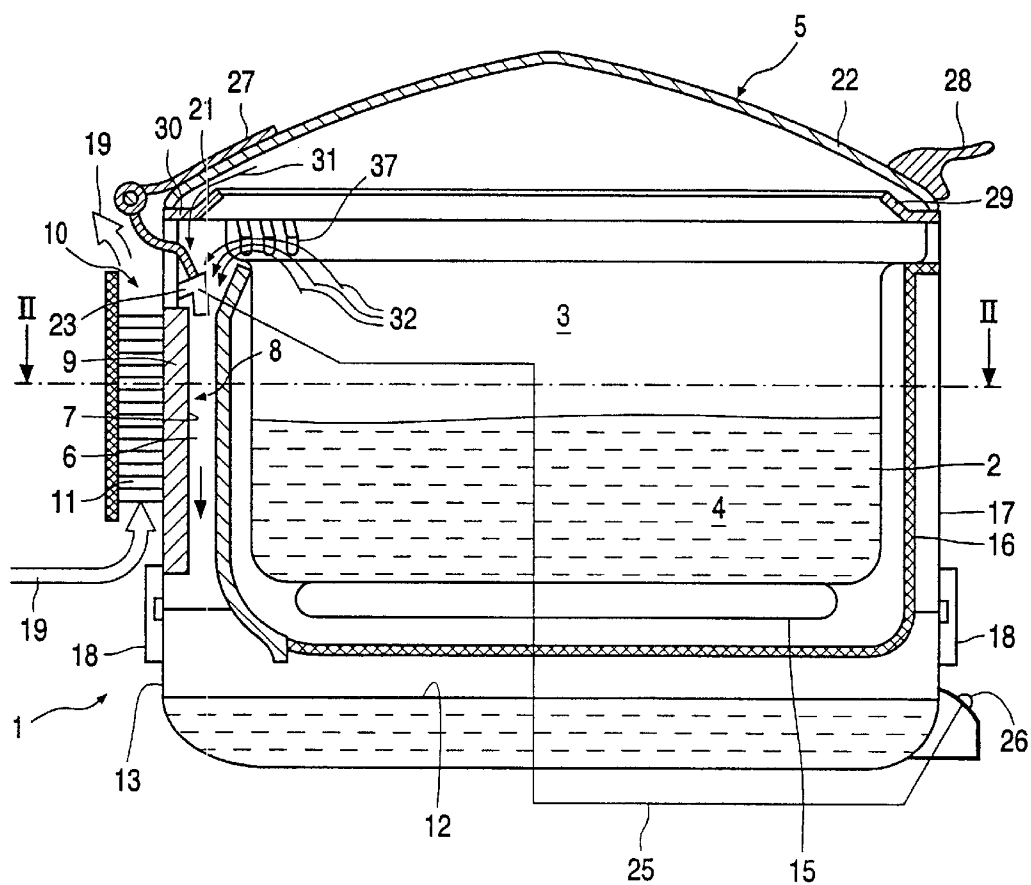
FIG. 1 is a sectional side elevation of an apparatus according to a first example of embodiment of the invention.

The apparatus for deep-frying food according to the embodiment, which is shown in FIG. 1, is a table-top model deep-frying pan 1. Also other embodiments of the deep-frying apparatus are possible, the deep-frying apparatus can, for example, be designed as a unit which is (to be) built into a kitchen cabinet.

The deep-frying pan 1 comprises an inner pan 2 including an inner space 3 for containing a frying medium 4 which is liquid in use, such as frying fat or frying oil. Another part of the deep-frying pan 1 is a deep-frying basket (not shown), which can be suspended in the inner pan 2. Such baskets are generally known from practice.

A cover 5, when placed on the inner pan 2, forms an upper boundary of an inner space 3 which is also bounded by the inner pan 2. A vapor discharge channel 6 extends from said inner space 3, which vapor discharge channel 6 communicates with the inner space 3 via inlets 37.

A cooling surface 7 made up of a surface of a heat exchanger 8 is provided for cooling vapors. The heat exchanger 8 includes a flat plate 9 of aluminium or another heat conducting material on the side of the vapor discharge channel. On the side facing away from the vapor discharge channel 6, the heat exchanger 8 includes an air duct 10 for transporting air that functions as a cooling medium for cooling the cooling surface. Heat exchanging lamellae 11 extend in the air duct 10. In use, ambient air flows through the air duct 10, as is indicated by arrows 19. Said air is heated through heat exchange with the lamellae 11 and the plate 9. The airflow in the air duct 10 is preferably produced by a fan, but it is also possible with suitably dimensioning to effect an airflow through the duct 10 solely by convection. The cooling surface 7 communicates with the inner space 3 via part of the vapor discharge channel 6, so that vapor being discharged from the inner space 3 during deep-frying (arrows 32) can reach the cooling surface 7 and condense thereon.

A storage reservoir 13, into which the vapor discharge channel 6 opens, is provided for collecting the condensate 12 that has precipitated on the cooling surface 7.

The pan comprises a heating element 15 for heating the frying fat or frying oil. The apparatus according to this embodiment furthermore comprises a double-walled housing including a thermally insulating inner wall 16 and an outer wall 17. The storage reservoir 13, which is connected to the outer wall 17 by means of detachable fastenings 18, also forms a bottom portion of the housing.

In use, food is deep-fried in the inner space 3 in the deep-frying medium 4 that is heated by the heating element. During this process, substantial amounts of water vapor are released, which leave the inner space 3 via the vapor discharge channel 6. A portion of the water vapor condenses on the cooling surface 7 and drips into the storage reservoir. Another portion of the water vapor being discharged condenses in the storage reservoir 13. Consequently, it is not necessary to discharge vapor into the environment, although such discharge may take place to a certain extent if complete condensation of the water vapor being released appears to be impossible.

The cooling surface 7 heats up as a result of heat exchange with passing vapor and the condensation of vapor on the cooling surface. Also cooling of the cooling surface takes place, however, on account of the fact that heat is given off, via the plate 9, to the lamellae 11, which in turn give off the heat to the air flow 19 that passes through the air duct 10. Also other ways of cooling the surface are possible, however, for example through heat exchange with a pre-cooled medium having a large thermal capacity, such as ice.

A temperature sensor 23 is mounted in an upstream portion of the vapor discharge channel 6. Said temperature sensor 23 is connected to display 26, which is provided with an indicator light in this embodiment, via a connection 25. The temperature sensor 23, which is arranged for generating a signal if the temperature of the sensor is at least of the order of 100° C., is quickly heated during deep-frying activity by water vapor condensing thereon. As soon as the supply of water vapor stops, because no food is present in the frying fat, the temperature sensor will turn off again. Thus it is possible to see whether food is present in the pan, which food is being deep-fried, without opening the pan. This is of particular importance, especially for a deep-frying pan comprising a cooling surface for causing water vapor which is released during deep-frying to condense thereon, because no water vapor or, at any rate, less water vapor, will be released during the deep-frying activity, so that it is impossible to tell from the water vapor that is released that the deep-frying process is in progress.

The apparatus according to this example of embodiment furthermore has a window 22 of a transparent material which, in this example, takes up the entire cover 5 with the exception of fittings—in this embodiment hinge fittings 27, handle 28 and sealing strips 29. The window 22 is inclined for the greater part, so that water condensing on the window 22 will run down over the window 22 to an outer edge of the window 22 rather than fall into the deep-drying medium 4. It is very advantageous in that case if the slope of the window increases towards the outside. As drops grow in size as a result of water accumulation when drops are running down, they tend to fall from the surface of the transparent material of the window 22. Since the slope of the surface of the transparent material of the window increases as the drops grow larger, the drops are prevented from falling from the window 22, while the height of the window 22 can be kept relatively limited.

A collecting gutter 21 for collecting condensate that has precipitated on the window 22 extends along a bottom end of the window. The collecting gutter 21 has a drain 30 via which the collecting gutter 21 communicates with the vapor discharge channel 6 for draining condensate that has been caught, as is schematically indicated by arrow 31. Via the vapor discharge channel 6 the water reaches the storage reservoir 13 for water 12 that has condensed on the cooling surface. The vapor discharge channel 6 thus functions not only as a means for discharging vapor, but also as a drain for the water that has condensed on the transparent material in the window 22.

Since the vapor discharge channel 6 of the pan according to this example of embodiment has an upstream end in the area of the edge of the cover 5 and extends in a direction away from the cover 5, it does not extend along the cover 5, where it would partially hide the food in the pan 2 from view. Thus it is possible to provide a window having a very large effective area, which in turn is advantageous as regards the incidence of light in the pan and the visibility of the food.

Conducive to obtaining a large field of vision and an advantageous incidence of light is furthermore the fact that the collecting gutter extends along an outer edge of the cover 5, at least when the cover is present on the pan, and the fact that the window 22 substantially completely covers an area enclosed by the outer edge of the cover 5 seen in top plan view.

For simplicity of construction, it is furthermore advantageous for the vapor discharge channel 6 to have an upstream end, which is situated at least partially under an upper edge of the pan 2 extending round an upper end of the pan. This construction obviates the need to discharge water vapor via the drain 30 of the collecting gutter 21, which discharge can now be provided in a simple manner via separate inlets 32. The inlets 32 can also function as an overflow in that case, thus reducing the risk of hot oil overflowing the housing upon foaming.

The cover 5 hinges on the hinge 27. Since the cover 5 can hinge with respect to the pan 2 and since the collecting gutter 21 is attached to the cover 5 so as to pivot along with the cover 5 upon opening and closing thereof, water that is present in the collecting gutter is effectively discharged each time the cover is opened. In addition, the collecting gutter 21 thus prevents water which runs down over the transparent material of the window 22 from finding its way into the oil, even in the open position of the cover.

Since the drain 30 of the collecting gutter 21 is disposed above an inlet of the vapor discharge channel 6 so as to discharge water being drained via the drain 30 into the vapor discharge channel 6 in the open position of the cover, water that is drained in the open position of the cover will be carried to the vapor discharge channel 6, too.

Figure 2:
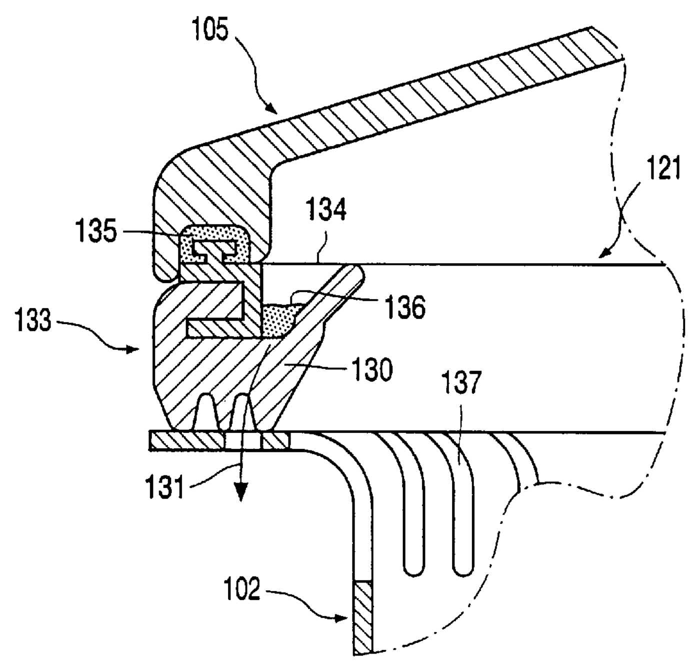
FIG. 2 is a schematic, sectional side elevation of an edge portion of an apparatus according to a second example of embodiment of the invention.
Figure 3:
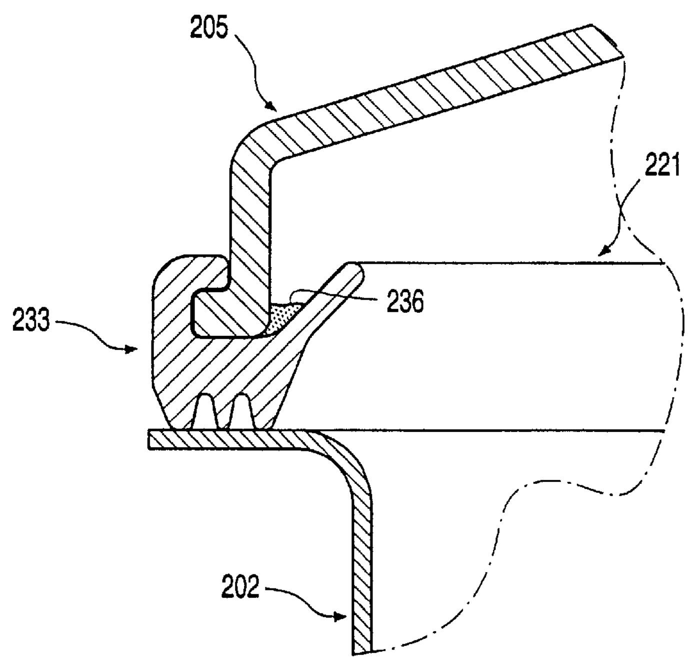
FIG. 3 is a schematic, sectional side elevation of an edge portion of an apparatus according to a third example of embodiment of the invention.

FIGS. 2 and 3 are more detailed views of a few possible embodiments of the collecting gutter. The collecting gutter 121, 221 of the two embodiments is integrated in a sealing strip 133, 233, which forms a sealing between the pan 102, 202 and the cover 105, 205, at least when the cover 105, 205 is present on the pan 102, 202.

136, 236 indicate water caught in the gutter. In FIG. 2, an arrow 131 indicates the drainage of water via one of the drain openings 130. FIG. 2 furthermore shows inlet openings 137 of the vapor discharge channel 6.

The example of embodiment shown in FIG. 2 furthermore includes a frame 134 extending circumferentially with the sealing strip 133, which frame functions as a support for the flexible material of the sealing strip 133. The use of such a frame 134 has the advantage that larger flatness tolerances of the bottom edge of the cover 105 can be accepted without the sealing effect being unacceptably affected. The deviations in the planeness can be filled with, for example, a gap-filling glue 135 with which the frame 134 is fixed to the cover 105. Also other solutions are possible, however, such as having the frame of the sealing strip join the cover with a force fit. The possibility of correcting deviations in the planeness of the bottom edge of the cover 105 is particularly important if the cover is made of glass, in which case the maintaining of precise tolerances is a relatively difficult and strongly cost-increasing process.

The advantage of using glass as the transparent material of the window, which glass moreover forms a self-sustaining supporting structure of the cover, is that a cover is obtained which exhibits great dimensional stability and rigidity, even at high temperatures. In addition, the use of glass obviates the need to provide a supporting structure which interferes with the incidence of light and obstructs a user's view of the food.

In the embodiment that is shown in FIG. 3, the sealing strip 233 is stretched directly over a circumferential flange 236 of the cover 205. Such a construction requires few parts and enables easy replacement of the sealing strip, for example in the case of damage to or ageing of the flexible material.

We claim:

1. An apparatus for deep-frying food, comprising a pan (2; 102; 202) for containing a frying medium (4) which is liquid in use, a cover (5; 105; 205), the cover (5; 105; 205), when placed on the pan, and the pan (2; 102; 202) together defining an inner space (3), a window (22) of a transparent material, which takes up at least a portion of a cover (5; 105; 205) and which extends at least partially in a sloping or vertical manner, and a vapor discharge channel (6) communicating with said inner space (3), extending from an upper portion of said inner space (3), characterized by a cooling surface (7) for cooling vapors, which cooling surface (7) communicates with said inner space (3) via at least a portion of said vapor discharge channel (6), a storage reservoir (13) for storing condensate that has precipitated on said cooling surface (7), into which storage reservoir (13) the vapor discharge channel (6) opens, and a collecting gutter (21; 121; 221) for collecting condensate that has precipitated on the window (22), which collecting gutter (21; 121; 221) extends along a bottom end of the window (22) and is provided with a drain (30; 130), via which drain the collecting gutter (21; 121; 221 ) communicates with the vapor discharge channel (6) for draining condensate to the vapor discharge channel (6).

2. An apparatus as claimed in claim 1, in which the vapor discharge channel (6) has an upstream end (37; 137) in the area of the edge of the cover (5; 105; 205) and which extends in a direction away from the cover (5; 105; 205).

3. An apparatus as claimed in claim 1, in which the vapor discharge channel (6) has an upstream end (37; 137) which is at least in part disposed under an upper edge of the pan (2) extending round an upper end of the pan (2).

4. An apparatus as claimed in claim 1, in which the collecting gutter (21; 121; 221) extends along an outer edge of the cover (5; 105; 205), at least when the cover is present on the pan, and in which the window (22) covers an area enclosed by the outer edge of the cover substantially entirely, seen in plan view.

5. An apparatus as claimed in claim 1, in which the collecting gutter (21; 121; 221) is integrated in a sealing strip (133; 233) which forms a sealing between the pan (2) and the cover (5; 105; 205), at least when the cover (5; 105; 205) is present on the pan (2).

6. An apparatus as claimed in claim 5, further comprising a frame (134) extending circumferentially with the sealing strip (133) for supporting flexible material of the sealing strip.

7. An apparatus as claimed in claim 1, in which the cover (5; 105; 205) can hinge with respect to the pan (2) and the collecting gutter (21; 121; 221) is attached to the cover (5; 105; 205) so as to pivot along with the cover (5; 105; 205) upon opening and closing of the cover (5; 105; 205).

8. An apparatus as claimed in claim 7, in which the drain (30; 130) of the collecting gutter (21; 121; 221) is disposed above an inlet of the vapor discharge channel (6) so as to discharge condensate being drained via the drain (30; 130) into the vapor discharge channel (6) in the open position of the cover (5; 105; 205).

9. An apparatus as claimed in claim 1, in which the transparent material of the window (22) is glass, which forms a self-sustaining supporting structure of the cover (5; 105; 205).

10. An apparatus for deep-frying food, comprising:

a pan (2; 102; 202) for containing a frying medium (4) which is liquid in use, a cover (5; 105; 205), the cover (5; 105; 205), when placed on the pan, and the pan (2; 102; 202) together defining an inner space (3), and a vapor discharge channel (6) communicating with said inner space (3), and extending from an upper portion of said inner space (3), characterized by a temperature sensor (23) in the vapor discharge channel 6, which temperature sensor (23) is connected to a signalling element (26) which is arranged for generating a signal in response to a signal from the temperature sensor (23) that represents a temperature above a lower limit in a range from 90–110° C., preferably at least 95–105° C.

11. An apparatus as claimed in claim 10, further comprising:

a cooling surface (7) for cooling vapors, which cooling surface (7) communicates with said inner space (3) via at least a portion of said vapor discharge channel (6), and a storage reservoir (13) for storing condensate that has precipitated on the cooling surface (7), into which storage reservoir (13) the vapor discharge channel (6) opens.

* * * * *